(12) United States Patent
Mizuguchi

(10) Patent No.: US 11,205,815 B2
(45) Date of Patent: Dec. 21, 2021

(54) SECONDARY BATTERY

(71) Applicant: Murata Manufacturing Co., Ltd., Nagaokakyo (JP)

(72) Inventor: Yuji Mizuguchi, Nagaokakyo (JP)

(73) Assignee: MURATA MANUFACTURING CO., LTD., Nagaokakyo (JP)

(*) Notice: Subject to any disclaimer, the term of this patent is extended or adjusted under 35 U.S.C. 154(b) by 167 days.

(21) Appl. No.: 16/550,420

(22) Filed: Aug. 26, 2019

(65) Prior Publication Data
US 2019/0379012 A1    Dec. 12, 2019

Related U.S. Application Data

(63) Continuation of application No. PCT/JP2018/019969, filed on May 24, 2018.

(30) Foreign Application Priority Data

Jun. 19, 2017 (JP) .............................. JP2017-119819

(51) Int. Cl.
*H01M 50/183* (2021.01)
*H01M 10/0525* (2010.01)
(Continued)

(52) U.S. Cl.
CPC ..... *H01M 50/183* (2021.01); *H01M 10/0525* (2013.01); *H01M 50/116* (2021.01); *H01M 50/124* (2021.01); *H01M 2220/30* (2013.01)

(58) Field of Classification Search
CPC ............. H01M 50/183; H01M 50/124; H01M 50/116; H01M 10/0525; H01M 2220/30
(Continued)

(56) References Cited

U.S. PATENT DOCUMENTS 8,945,744 B2 * 2/2015 Kwon .................. H01M 10/04
429/94
9,893,376 B2   2/2018 Yang et al.
(Continued)

FOREIGN PATENT DOCUMENTS

JP        S5865758 U      5/1983
JP     2004055154 A      2/2004
(Continued)

OTHER PUBLICATIONS

International Search Report issued in PCT/JP2018/019969, dated Aug. 14, 2018.
(Continued)

*Primary Examiner* — Milton I Cano
*Assistant Examiner* — Suphia Quraishi
(74) *Attorney, Agent, or Firm* — Arent Fox LLP

(57) ABSTRACT

A secondary battery that includes an electrode assembly and an exterior body which houses the electrode assembly. The exterior body includes a first exterior body and a second exterior body, and a sealing edge of the exterior body is formed by a combination of the first exterior body and the second exterior body. At the sealing edge, one of the first exterior body and the second exterior body is folded back upon itself so that an end surface of the first exterior body and an end surface of the second exterior body face each other, and an insulating material is provided between the facing end surfaces of the first exterior body and the second exterior body.

17 Claims, 7 Drawing Sheets

(51) Int. Cl.
   *H01M 50/116*    (2021.01)
   *H01M 50/124*    (2021.01)

(58) Field of Classification Search
   USPC .......................................................... 429/185
   See application file for complete search history.

(56) References Cited

U.S. PATENT DOCUMENTS

| | | | |
|---|---|---|---|
| 10,658,650 B2 * | 5/2020 | Shibutani | H01M 10/0587 |
| 10,797,298 B2 * | 10/2020 | Ishihama | H01M 50/60 |
| 10,840,555 B2 * | 11/2020 | Iwama | H01M 10/0431 |
| 2012/0015224 A1 * | 1/2012 | Pytlik | H01M 50/109 |
| | | | 429/94 |
| 2014/0099525 A1 * | 4/2014 | Kwon | H01M 10/04 |
| | | | 429/94 |
| 2016/0049687 A1 | 2/2016 | Yang et al. | |
| 2019/0379012 A1 * | 12/2019 | Mizuguchi | H01M 50/116 |
| 2021/0210794 A1 * | 7/2021 | Yamakaji | H01M 10/488 |

FOREIGN PATENT DOCUMENTS

| | | | |
|---|---|---|---|
| JP | 2015536036 A | 12/2015 | |
| JP | 2016091801 A | 5/2016 | |

OTHER PUBLICATIONS

Written Opinion of the International Searching Authority issued in PCT/JP2018/019969, dated Aug. 14, 2018.

\* cited by examiner

FIG. 7 — PRIOR ART
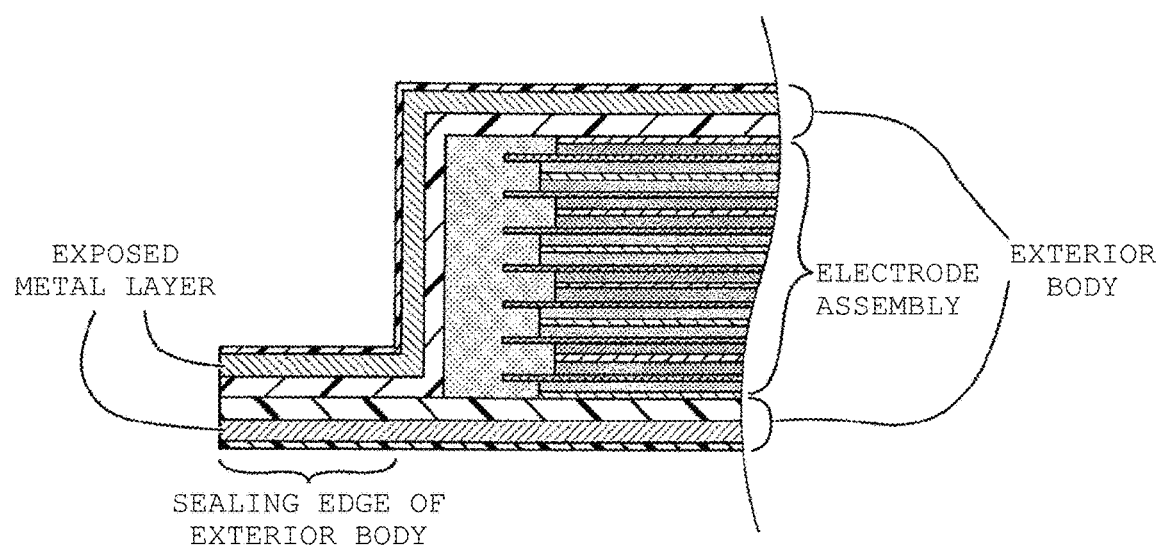

SECONDARY BATTERY

CROSS REFERENCE TO RELATED APPLICATIONS

The present application is a continuation of International application No. PCT/JP2018/019969, filed May 24, 2018, which claims priority to Japanese Patent Application No. 2017-119819, filed Jun. 19, 2017, the entire contents of each of which are incorporated herein by reference.

FIELD OF THE INVENTION

The present invention relates to a secondary battery. In particular, the present invention relates to a secondary battery including an electrode assembly having electrode configuration layers each including a positive electrode, a negative electrode, and a separator.

BACKGROUND OF THE INVENTION

Secondary batteries can be repeatedly charged and discharged because they are so-called storage batteries, and are used in various applications. For example, secondary batteries are used in mobile devices such as mobile phones, smartphones, and laptop computers.

In various battery applications including mobile devices and the like, secondary batteries are housed in a housing. That is, the secondary battery is disposed to partially occupy the inside of a housing of the device to be used.
Patent Document 1: Japanese Translation of PCT International Application Publication No. 2015-536036

SUMMARY OF THE INVENTION

The inventor of the present application noticed that there is a problem to be overcome in the conventional secondary battery, and found out the necessity of taking measures therefor. Specifically, the inventor of the present application has found that the following problems exist.

A secondary battery includes an electrode assembly in which electrode configuration layers each having a positive electrode, a negative electrode, and a separator therebetween are laminated, and an exterior body which encloses the electrode assembly. The exterior body includes a first exterior body and a second exterior body, and their peripheral edges are combined with each other to constitute a sealing edge.

Here, in the case where the first exterior body and the second exterior body each have a laminate structure formed by laminating a metal layer and insulating layers, the metal layers are exposed from the end of the sealing edge by combining the peripheral edges with each other so as to form a seal (see FIG. 7). Specifically, when the first exterior body and the second exterior body each having the laminate structure in which the metal layer is sandwiched by the insulating layers are combined with each other to form the sealing edge, the end surfaces of the metal layers are exposed at the edge of the sealing edge. The metal layer whose end surface is exposed at the outermost position of the sealing edge is not desirable because it may cause an adverse event such as a short. Therefore, it is necessary to perform an insulation treatment on the exposed end surface of the metal layer. As such an insulation treatment, for example, it is conceivable that an insulating tape is applied to the edge of the sealing edge, or the sealing edge is entirely bent a plurality of times (for example, bent twice or more) so as not to expose the metal layer.

However, regarding the application of the insulating tape, the application work of the insulating tape itself is relatively complicated. In other words, it is not easy to apply the tape properly without waste and exposing an adhesive surface of the tape to the outside (the tape has the adhesive surface and a non-adhesive surface, and it is necessary to clearly distinguish them and apply them). Further, if the tape is applied too large relative to the exposed size of the end, the extra part of the tape may damage the battery appearance, or depending on the application method, the extra part of the tape adhesive surface may be outside. Furthermore, bending of the sealing edge such that the metal layer end surface is not exposed is usually required twice or more, and the thickness of the sealing edge is increased due to such overall bending. That is, the energy density per unit volume may be excessively decreased by the bending for "non-exposure" (in particular, the number of times of bending necessary for non-exposure of the metal layer).

The present invention has been made in view of such problems, and a main object of the present invention is to provide a secondary battery more suitably including a sealing edge of an exterior body.

The inventor of the present application has attempted to solve the above-mentioned problems by addressing in a new direction, instead of addressing in the extension of the conventional art. As a result, the invention of a secondary battery in which the main object is achieved is reached.

According to the present invention, there is provided a secondary battery that includes an electrode assembly; and an exterior body which houses the electrode assembly. The exterior body incudes a first exterior body and a second exterior body, and a sealing edge of the exterior body is formed by a combination of the first exterior body and the second exterior body, in which, at the sealing edge, one of the first exterior body and the second exterior body is folded back upon itself so that an end surface of the first exterior body and an end surface of the second exterior body face each other. An insulating material is provided between the facing end surfaces of the first exterior body and the second exterior body.

In the secondary battery of the present invention, the sealing edge of the exterior body is more preferable.

Specifically, the sealing edge is insulated by filling the insulating material between the facing end surfaces of the first exterior body and the second exterior body, and the application of insulating tape has been eliminated. That is, no work is required to distinguish between the adhesive surface and the non-adhesive surface of the tape, and inconvenient events that may occur when the tape is applied too large are essentially avoided.

In the secondary battery of the present invention, only one of the first exterior body and the second exterior body is folded back instead of folding back both, and the thickness of the sealing edge is therefore not excessively increased. More specifically, if the first exterior body and the second exterior body (especially their peripheral edge portions) which are combined with each other are simply folded back and overlaid, the thickness of the sealing edge is increased due to the "overlaying." On the other hand, in the present invention, the thickness of the sealing edge is not substantially increased due to "folding back only one" (in particular, folding back of the exterior body so that the end surface of one exterior body and the end surface of the other exterior body are separated from each other and face each other). Therefore, in the present invention, the "energy density decrease" due to the increase in the thickness of the sealing edge caused by the "non-exposure" of the metal layer of the exterior body is avoided.

BRIEF EXPLANATION OF THE DRAWINGS

FIG. 7 is a schematic cross-sectional view for describing the conventional art in which the end surfaces of the metal layers are exposed at the sealing edge (conventional art).

DETAILED DESCRIPTION OF THE INVENTION

Figure 1A:
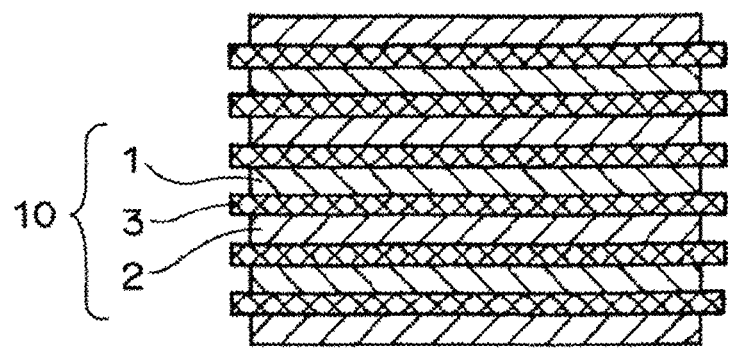
FIGS. 1(A) and 1(B) are cross-sectional views schematically illustrating electrode configuration layers (FIG. 1(A): non-winding flat laminated type, FIG. 1(B): winding type).

Hereinafter, a secondary battery according to an embodiment of the present invention is described in more detail. Although the description is given with reference to the drawings as necessary, various elements in the drawings are merely schematically and exemplarily illustrated for the understanding of the present invention, and the appearance, size ratio, etc. may be different from that of an actual secondary battery.

A "cross section (or cross sectional shape)" described directly or indirectly in the present specification is based on a virtual cross section which cuts through the secondary battery along a laminating direction of an electrode material layer (a thickness direction of the battery or the electrode material layer) constituting the secondary battery.

Furthermore, an "up-and-down direction" and a "right-and-left direction" used directly or indirectly in the present specification correspond to the up-and-down direction and the right-and-left direction in the drawings, respectively. Unless otherwise stated, the same reference signs or symbols indicate the same components or the same semantic content. In a preferred embodiment, a downward direction in a vertical direction (that is, a direction in which gravity acts) corresponds to a "down direction", and a direction opposite thereto corresponds to an "up direction".

[Basic Configuration of Secondary Battery]

The term "secondary battery" as used herein refers to a battery that can be repeatedly charged and discharged. Therefore, the secondary battery according to the present invention is not excessively limited by its name, and may include, for example, a storage device.

Figure 1B:
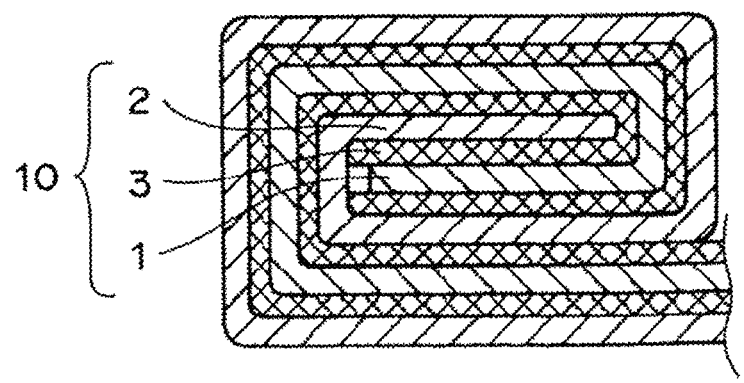

The secondary battery according to the present invention includes an electrode assembly in which electrode configuration layers each including a positive electrode, a negative electrode, and a separator are laminated. The electrode assembly is illustrated in FIGS. 1(A) and 1(B). As illustrated in FIGS. 1(A) and 1(B), a positive electrode 1 and a negative electrode 2 are stacked with a separator 3 interposed therebetween to form an electrode configuration layer 10. At least one or more of the electrode configuration layers 10 are laminated to constitute an electrode assembly, or alternatively, the electrode configuration layer 10 is laminated while being wounded to constitute an electrode assembly. In the secondary battery, such an electrode assembly is enclosed in an exterior body together with an electrolyte (for example, a non-aqueous electrolyte). Thus, the structure of the electrode assembly is not necessarily limited to the flat laminated structure, and may be a wound structure (jelly roll type) in which the electrode configuration layer is wound in a roll, and further, may be a so-called stack-and-fold structure in which a positive electrode, a separator, and a negative electrode are be laminated on a long film and then folded.

The positive electrode is composed of at least a positive electrode material layer and a positive electrode current collector. In the positive electrode, a positive electrode material layer is provided on at least one side of a positive electrode current collector, and the positive electrode material layer contains a positive electrode active material as an electrode active material. For example, in the plurality of positive electrodes in the electrode assembly, the positive electrode material layers may be provided on both sides of the positive electrode current collector, or the positive electrode material layer may be provided on only one side of the positive electrode current collector. From the viewpoint of further increasing the capacity of the secondary battery, it is preferable that the positive electrode is provided with the positive electrode material layers on both sides of the positive electrode current collector.

The negative electrode is composed of at least a negative electrode material layer and a negative electrode current collector. In the negative electrode, a negative electrode material layer is provided on at least one side of a negative electrode current collector, and the negative electrode material layer contains a negative electrode active material as an electrode active material. For example, in the plurality of negative electrodes in the electrode assembly, the negative electrode material layers may be provided on both sides of the negative electrode current collector, or the negative electrode material layer may be provided on only one side of the negative electrode current collector. From the viewpoint of further increasing the capacity of the secondary battery, it is preferable that the negative electrode is provided with the negative electrode material layers on both sides of the negative electrode current collector.

The electrode active materials contained in the positive electrode and the negative electrode, that is, the positive electrode active material and the negative electrode active material are substances directly involved in delivery of electrons in the secondary battery, and are main substances of the positive and negative electrodes responsible for charge and discharge, that is, battery reaction. More specifically, ions are provided to the electrolyte due to the "positive electrode active material contained in the positive electrode material layer" and the "negative electrode active material contained in the negative electrode material layer", and such ions move between the positive electrode and the negative electrode to deliver electrons, so that charge and discharge is performed. In particular, it is preferable that the positive electrode material layer and the negative electrode material layer are layers capable of storing and releasing lithium ions. That is, it is preferable that the non-aqueous electrolyte secondary battery is such that lithium ions move between the positive electrode and the negative electrode through the non-aqueous electrolyte to perform charge and discharge of the battery. When the lithium ions are involved in charge and discharge, the secondary battery according to the present invention corresponds to a so-called lithium ion battery, and the positive electrode and the negative electrode have a layer capable of storing and releasing lithium ions.

The positive electrode active material of the positive electrode material layer is made of, for example, a granular material, and it is preferable that binder is contained in the positive electrode material layer in order to secure more sufficient contact between the particles and maintain the shape. Further, a conductive assistant agent may be contained in the positive electrode material layer in order to facilitate transfer of electrons for promoting cell reaction. Similarly, the negative electrode active material of the negative electrode material layer is made of, for example, a granular material, it is preferable that binder is contained in order to secure more sufficient contact between the particles and maintain the shape, and a conductive assistant agent may be contained in the negative electrode material layer in order to facilitate transfer of electrons for promoting cell reaction. Thus, the positive electrode material layer and the negative electrode material layer can also be referred to as a positive electrode mixture layer and a negative electrode mixture layer, respectively, because of the form in which a plurality of components are contained.

It is preferable that the positive electrode active material is a material that contributes to storage and release of lithium ions. In this respect, it is preferable that the positive electrode active material is, for example, a lithium-containing composite oxide. More specifically, it is preferable that the positive electrode active material is a lithium transition metal complex oxide containing lithium and at least one transition metal selected from the group consisting of cobalt, nickel, manganese, and iron. That is, in the positive electrode material layer of the secondary battery according to the present invention, such a lithium transition metal complex oxide is preferably contained as the positive electrode active material. For example, the positive electrode active material may be lithium cobaltate, lithium nickelate, lithium manganate, lithium iron phosphate, or one in which their transition metals are partially replaced with another metal. Such a positive electrode active material may be contained as a single kind but may be contained in combination of two or more. Although it is only an example, in the secondary battery according to the present invention, the positive electrode active material contained in the positive electrode material layer may be lithium cobaltate.

The binder that may be contained in the positive electrode layer is not particularly limited, and there can be given at least one selected from the group consisting of polyfluorinated vinylidene, vinylidene fluoride-hexafluoropropylene copolymer, vinylidene fluoride-tetrafluorotyrene copolymer, polytetrafluoroethylene, and the like. The conductive assistant agent that may be contained in the positive electrode layer is not particularly limited, and there can be given at least one selected from thermal black, furnace black, channel black, carbon black such as ketjen black and acetylene black, graphite, carbon nanotubes, carbon fibers such as vapor phase growth, metal powders such as copper, nickel, aluminum, and silver, polyphenylene derivatives, and the like. For example, the binder of the positive electrode material layer may be polyvinylidene fluoride, and the conductive assistant agent of the positive electrode material layer may be carbon black. Although it is only an example, the binder and the conductive assistant agent of the positive electrode material layer may be a combination of polyvinylidene fluoride and carbon black.

It is preferable that the negative electrode active material is a material that contributes to storage and release of lithium ions. In this respect, it is preferable that the negative electrode active material is, for example, various carbon materials, an oxide, a lithium alloy, or the like.

As various carbon materials of the negative electrode active material, there can be given graphite (natural graphite and artificial graphite), hard carbon, soft carbon, diamond-like carbon, and the like. In particular, graphite is preferable in high electron conductivity and excellent adhesion to the negative electrode current collector. As the oxide of the negative electrode active material, there can be given at least one selected from the group consisting of silicon oxide, tin oxide, indium oxide, zinc oxide, lithium oxide, and the like. The lithium alloy of the negative electrode active material may be any metal that may be alloyed with lithium, and, for example, may be a binary, ternary, or higher alloy of lithium and metal such as Al, Si, Pb, Sn, In, Bi, Ag, Ba, Ca, Hg, Pd, Pt, Te, Zn, and La. It is preferable that such an oxide is amorphous as its structural form. This is because deterioration due to nonuniformity such as grain boundaries or defects is less likely to occur. Although it is only an example, in the secondary battery according to the present invention, the negative electrode active material of the negative electrode material layer may be artificial graphite.

As the binder that may be contained in the negative electrode layer is not particularly limited, and there can be given at least one selected from the group consisting of styrene butadiene rubber, polyacrylic acid, polyvinylidene fluoride, polyimide resin, and polyamideimide resin. For example, the binder contained in the negative electrode material layer may be styrene butadiene rubber. The conductive assistant agent that may be contained in the negative electrode layer is not particularly limited, and there can be given at least one selected from thermal black, furnace black, channel black, carbon black such as ketjen black and acetylene black, graphite, carbon nanotubes, carbon fibers such as vapor phase growth, metal powders such as copper, nickel, aluminum, and silver, polyphenylene derivatives, and the like. In addition, a component derived from a thickener component (for example, carboxymethylcellulose) used at the time of battery manufacture may be contained in the negative electrode material layer.

Although it is only an example, the negative electrode active material and the binder in the negative electrode layer may be a combination of artificial graphite and styrene butadiene rubber.

The positive electrode current collector and the negative electrode current collector used for the positive electrode and the negative electrode are members that contribute to collecting and supplying electrons generated in the active material due to cell reaction. Such a current collector may be a sheet-like metal member, and may have a porous or perforated form. For example, the current collector may be a metal foil, punching metal, netting, expanded metal, or the like. It is preferable that the positive electrode current collector used for the positive electrode is made of a metal foil containing at least one selected from the group consisting of aluminum, stainless steel, nickel, and the like, and may be, for example, an aluminum foil. On the other hand, it is preferable that the negative electrode current collector used for the negative electrode is made of a metal foil containing at least one selected from the group consisting of copper, stainless steel, nickel, and the like, and may be, for example, a copper foil.

The separators used for the positive electrode and the negative electrode are members provided from the viewpoint of preventing short circuit due to contact of positive and negative electrodes and holding the electrolyte. In other words, the separator is a member that allows ions to pass while preventing electronic contact between the positive electrode and the negative electrode. Preferably, the separator is a porous or microporous insulating member and has a membrane morphology due to its small thickness. Although it is only an example, a microporous membrane made of polyolefin may be used as a separator. In this respect, the microporous membrane used as a separator may contain, for example, only polyethylene (PE) or only polypropylene (PP) as the polyolefin. Furthermore, the separator may be a laminate composed of "microporous membrane made of PE" and "microporous membrane made of PP". The surface of the separator may be covered with an inorganic particle coat layer, an adhesive layer, or the like. The surface of the separator may have adhesiveness. In the present invention, the separator should not be particularly limited by the name, and may be a solid electrolyte having a similar function, a gel electrolyte, insulating inorganic particles, or the like.

In the secondary battery according to the present invention, the electrode assembly including the electrode configuration layers (each including the positive electrode, the negative electrode, and the separator) is enclosed in the exterior body together with the electrolyte. When the positive electrode and the negative electrode each have a layer capable of storing and releasing lithium ions, it is preferable that the electrolyte is a "non-aqueous" electrolyte such as an organic electrolyte or an organic solvent (that is, the electrolyte is a non-aqueous electrolyte). In the electrolyte, metal ions released from the electrodes (positive electrode and negative electrode) are present, and therefore, the electrolyte assists movement of the metal ions in cell reaction.

The non-aqueous electrolyte is an electrolyte containing a solvent and a solute. As a specific non-aqueous electrolyte solvent, one containing at least carbonate is preferable. Such carbonate may be cyclic carbonates and/or linear carbonates. Although not particularly limited, as the cyclic carbonates, there can be given at least one selected from the group consisting of propylene carbonate (PC), ethylene carbonate (EC), butylene carbonate (BC), and vinylene carbonate (VC). As the linear carbonates, there can be given at least one selected from the group consisting of dimethyl carbonate (DMC), diethyl carbonate (DEC), ethyl methyl carbonate (EMC), and dipropyl carbonate (DPC). Although it is only an example, a combination of cyclic carbonates and linear carbonates may be used as the non-aqueous electrolyte, and, for example, a mixture of ethylene carbonate and diethyl carbonate is used. Further, as a specific non-aqueous electrolyte solute, for example, Li salt such as $LiPF_6$ and/or $LiBF_4$ is preferably used.

The exterior body of the secondary battery encloses the electrode assembly in which the electrode configuration layers each including the positive electrode, the negative electrode, and the separator are laminated, but may be in the form of a hard case or even in the form of a soft case. Specifically, the exterior body may be a hard case type equivalent to a so-called metal can, or may be a soft case type equivalent to a pouch made of a so-called laminate film. Although described later, in view of the characteristic matters of the present invention, it is preferable that the exterior body in the secondary battery according to the present invention is a soft case type.

[Features of Secondary Battery of the Present Invention]

The secondary battery of the present invention is characterized by its exterior body. In the present invention, a sealing edge of the exterior body for housing the electrode assembly is formed by a combination of a first exterior body and a second exterior body that form the exterior body, and has a unique folded form and at least a suitable member for the unique folded back.

Figure 2:
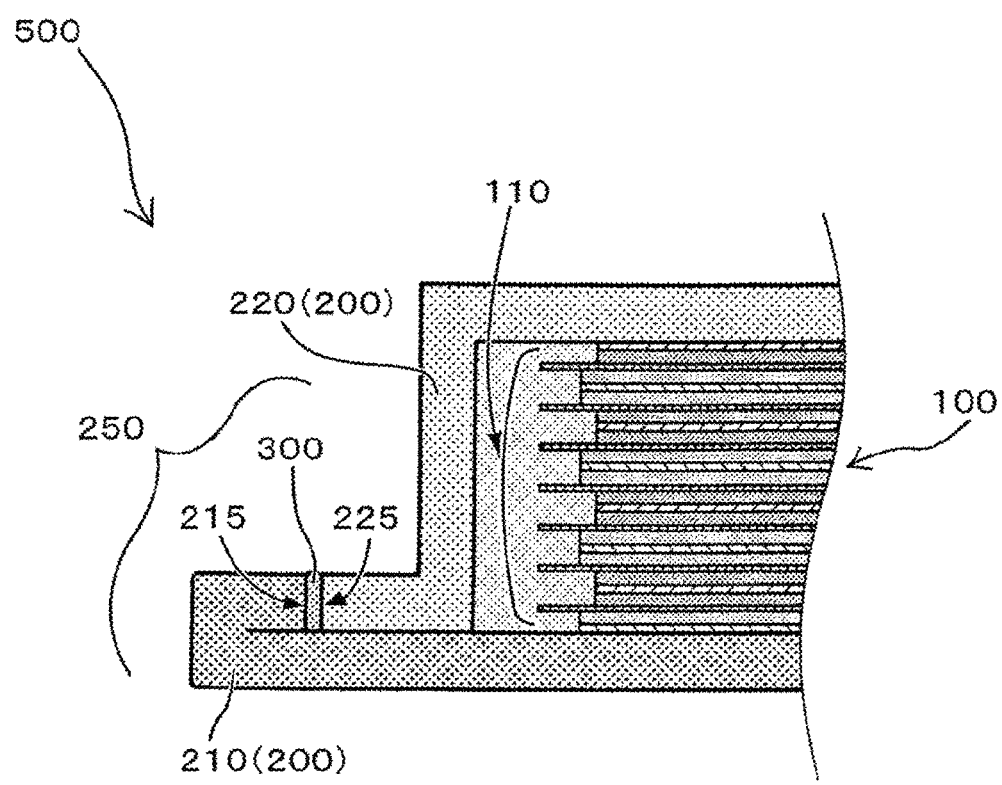
FIG. 2 is a schematic sectional view illustrating a configuration of an exterior body of a secondary battery according to an embodiment of the present invention.

As illustrated in FIG. 2, a sealing edge 250 of an exterior body 200 which houses an electrode assembly 100 is formed by a combination of a first exterior body 210 and a second exterior body 220. As illustrated in FIG. 2, in the sealing edge 250 of the secondary battery according to the present invention, one of the first exterior body 210 and the second exterior body 220 is folded back so that an end surface 215 of the first exterior body 210 and an end surface 225 of the second exterior body 220 face each other, and an insulating material 300 is provided between these two facing end surfaces. In other words, the gap between the one folded exterior body and the other exterior body is filled with the insulating material 300. In the embodiment illustrated in FIG. 2, only the first exterior body 210 among the first exterior body 210 and the second exterior body 220 is folded back.

As can be seen from the embodiment illustrated in FIG. 2, one of the first exterior body 210 and the second exterior body 220 corresponding to sub exterior bodies is positioned so as to entirely cover the upper main surface of the electrode assembly 100, and the other thereof is positioned so as to entirely cover the lower main surface of the electrode assembly 100. In the embodiment illustrated in FIG. 2, the first exterior body 210 is positioned so as to cover the lower main surface of the electrode assembly 100, while the second exterior body 220 is positioned so as to cover the upper main surface of the electrode assembly 100. However, the opposite may be possible. That is, while the folded first exterior body 210 is positioned so as to cover the upper main surface of the electrode assembly 100, the unfolded second exterior body 220 may be positioned so as to cover the lower main surface of the electrode assembly 100. In addition, the first exterior body and the second exterior body may be formed of the same exterior body. That is, the sealing edge of the secondary battery may be formed by a combination of the first exterior body and the second exterior body, which are provided by folding back a single exterior body so as to sandwich the electrode assembly (in other words, in such a case, the first exterior body and the second exterior body become substantially the same). Alternatively, the sealing edge of the secondary battery may be formed by a combination of separate first exterior body and second exterior body constituting the exterior body.

The sealing edge 250 is configured by overlaying the peripheral portions of the sub exterior bodies (210 and 220) on each other. As illustrated in FIG. 2, in the secondary battery 500 of the present invention, the electrode assembly is enclosed by closely overlaying the one sub exterior body and the other sub exterior body on the side of the electrode assembly 100. In the embodiment illustrated in FIG. 2, the second exterior body 220 surrounds a side surface 110 of the electrode assembly 100 so that the level of the sealing edge 250 is located on the lower side of the cross section of the electrode assembly 100. The present invention is not particularly limited thereto, and the folded first exterior body 210 may surround the side surface 110 of the electrode assembly 100, and the level of the sealing edge 250 may be located on the upper side of the cross section of the electrode assembly 100. Further, both the first exterior body 210 and the second exterior body 220 may surround the side surface 110 of the electrode assembly 100, and the level of the sealing edge 250 may be positioned at the middle of the thickness of the electrode assembly 100.

Figure 3:
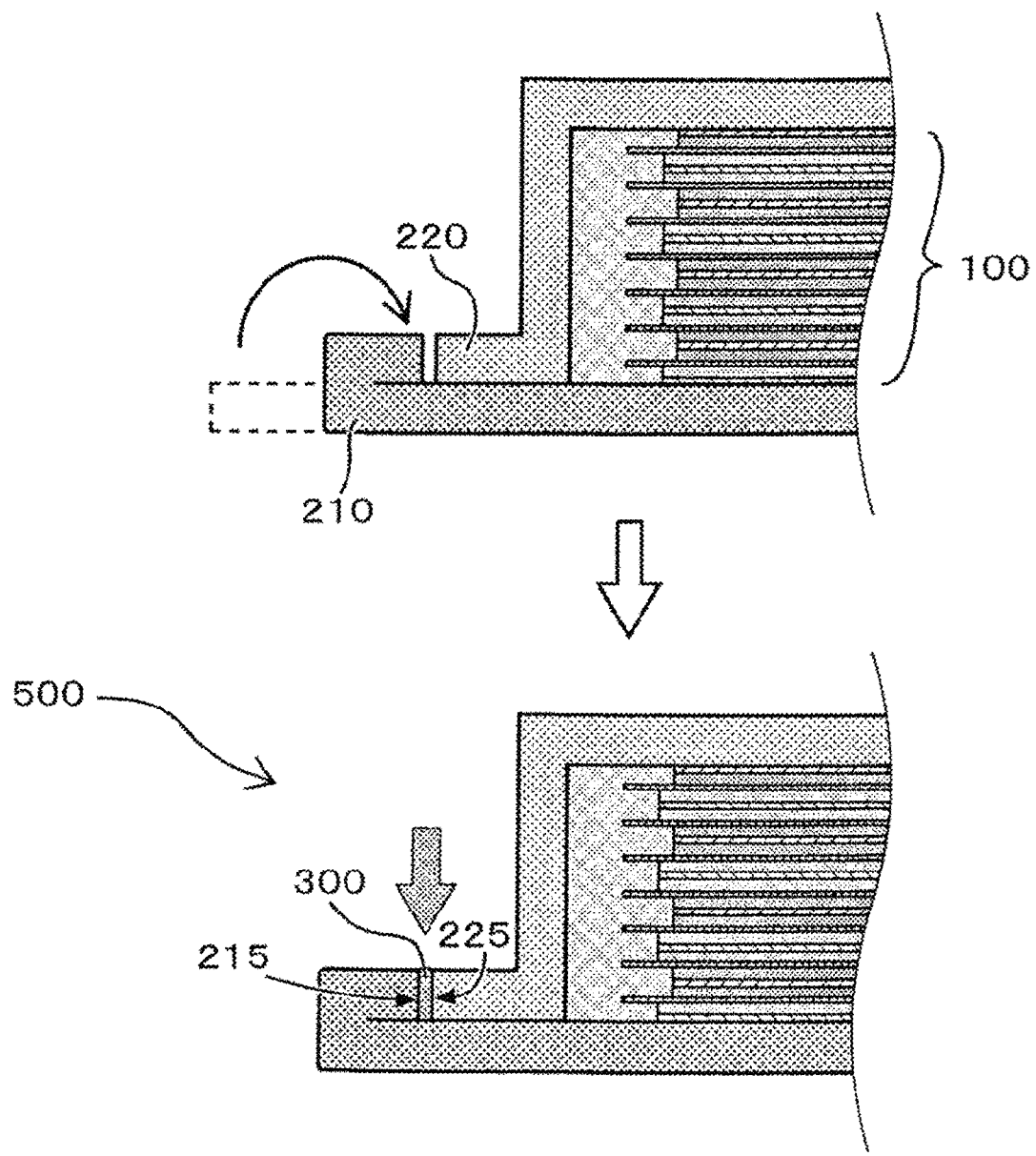
FIG. 3 is a schematic sectional view for describing "folding of only one".

As illustrated in FIG. 3, the secondary battery of the present invention has a form in which only one of the sub exterior bodies (210 and 220) is folded back. The respective end surfaces of the sub exterior bodies (210 and 220) are caused to face each other by the folding of only one thereof. As illustrated in FIG. 3, the sub exterior body is folded back so as to be bent substantially at 180°. In addition, with respect to the sub exterior body to be folded back, another member, a space, or the like is preferably not interposed inside the folding back. Preferably, the end surface 215 of the first exterior body 210 and the end surface 225 of the second exterior body 220 of the sub exterior bodies are separated from each other. In the embodiment illustrated in FIGS. 2-4, only the first exterior body 210 is folded back while the second exterior body 220 is not folded back, and the end surface 215 of the first exterior body 210 and the end surface 225 of the second exterior body 220 are separated from each other and face each other. As can be seen from FIG. 3, the folded back sub exterior body may extend longer outwards than the other as viewed from the electrode assembly 100, and is folded back so that the longer extendable portions overlap one another. Further, the end surface of the folded exterior body is not in a butt state (in other words, a "contact state") with the other end surface.

As can be seen from the embodiment illustrated in FIG. 2, in the present invention, even though the exterior body is "folded", the thickness of the sealing edge is not increased because only one sub exterior body is folded back so as to be overlapped on itself. Further, although the exterior body (more specifically, each of the sub exterior bodies) has a metal layer as its inner layer, the end surfaces of the sub exterior bodies are folded back so as to face each other, so that it is avoided that the metal layer surfaces are exposed at the edge of the sealing edge 250 (the edge at the outermost position).

In the present invention, the end surface 215 of the first exterior body 210 and the end surface 225 of the second exterior body 220 face each other by the "folding back", but the gap therebetween (hereinafter also referred to as a "facing gap") is filled with the insulating material 300 (see FIG. 2). That is, the insulating material 300 is packed between one end surface and the other end surface of the sub exterior bodies (210 and 220) positioned so as to face each other. Preferably, the overall space between the one end surface and the other end surface of the opposing sub exterior bodies (210 and 220) is filled without a gap. In the secondary battery of the present invention, the "end surfaces of the sub exterior bodies facing each other" avoid exposure of the metal layer surfaces at the sealing edge (in particular, the outermost position of the sealing edge), and because the space between the end surfaces is filled with the insulating material, the exposure of the metal layer surfaces at that point (non-edge area) is also avoided. Therefore, it can be said that the sealing edge 250 in the secondary battery 500 of the present invention is such that the metal layer surfaces are more surely subjected to insulation treatment.

In the secondary battery of the present invention, although the insulation treatment of the metal layer surfaces at the sealing edge is more surely performed, only one sub exterior body is folded back so as to be overlapped on itself, and hence unfavorable thickening is avoided.

The insulating material 300 used for the sealing edge 250 has an insulating property and is not particularly limited as long as it contributes to the filling of the "opposing gap". For example, the insulating material 300 may contain a resin component (in that respect, the insulating material 300 may be a resin material). As such resin, there can be given those falling into the category of a sealant, an adhesive, and/or a bonding material.

It is preferable that the filled insulating material 300 is in direct contact with the end surface 215 of the first exterior body 210 and the end surface 225 of the second exterior body 220. For example, it is preferable that the insulating material 300 is provided so as to fill the overall facing gap, and is flush with at least one of the first exterior body 210 and the second exterior body 220. More preferably, the insulating material 300 that fills the facing gap is "flush" with the surfaces of both the first exterior body 210 and the second exterior body 220. In such a case, the shape of the insulating layer preferably includes a rectangular shape or a square shape in the cross section illustrated in FIG. 3 (cross section in which the sealing edge is in a projecting form and which is taken along a direction in which the folding of the sub exterior body can be confirmed).

Figure 4:
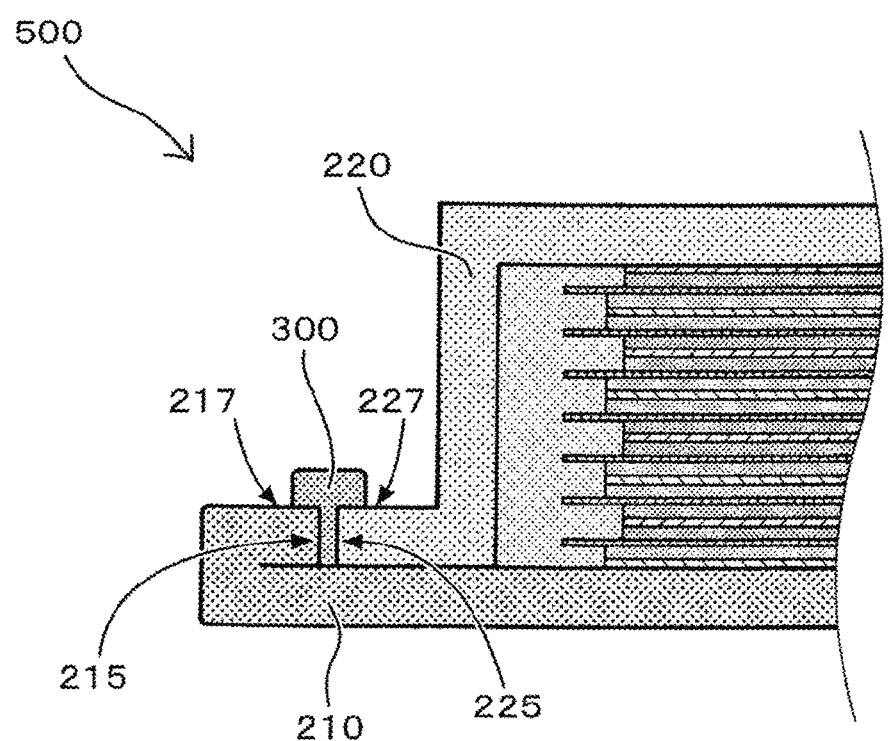
FIG. 4 is a schematic cross-sectional view for describing an "insulating material protruding from a gap between facing end surfaces".

In a preferred embodiment, the insulating material 300 is provided so as to protrude from the facing gap, and therefore, the insulating material spreads also on at least one of the surfaces of the first exterior body and the second exterior body. Specifically, as illustrated in FIG. 4, the insulating material 300 is also located on at least one of the surfaces of the first exterior body 210 and the second exterior body 220 while filling the opposing gap (gap between the end surface 215 and the end surface 225). That is, as illustrated in the figure, the insulating material 300 spreads or extends so as to protrude also on at least one of the surfaces of the first exterior body 210 and the second exterior body 220. For example, the insulating material 300 is provided between the end surface 215 and the end surface 225 so as to spread on both a surface 217 of the first exterior body 210 and a surface 227 of the second exterior body 220. That is, the insulating material 300 may be configured to plug the facing gap in the cross section as illustrated. In the illustrated cross section (cross section in which the sealing edge is in a projecting form and which is taken along the direction in which the folding of the sub exterior body can be confirmed), the insulating material 300 may have a substantially T shape. When the insulating material 300 is provided as described above, "insulation of the metal layer surfaces" in the exterior body can be more reliable and effective.

In the secondary battery of the present invention, it is preferable that the exterior body has flexibility. When the exterior body 200 (210 and 220) has flexibility, as illustrated in FIG. 2 and FIG. 3 etc., it is possible to obtain an enclosed form particularly adapted to the shape of the electrode assembly 100 and further a form in which the overlaying of the sub exterior bodies is more preferably assisted at the sealing edge. Further, such flexibility allows folding of one of the sub exterior bodies to be assisted, resulting in a sealing edge that does not substantially increase in thickness unfavorably. In the present specification, "having flexibility" substantially means that the exterior body is not a hard case type equivalent to a so-called metal can but is a soft case type, and in particular, the sub exterior body preferably has a thin form in a film shape.

Figure 5:
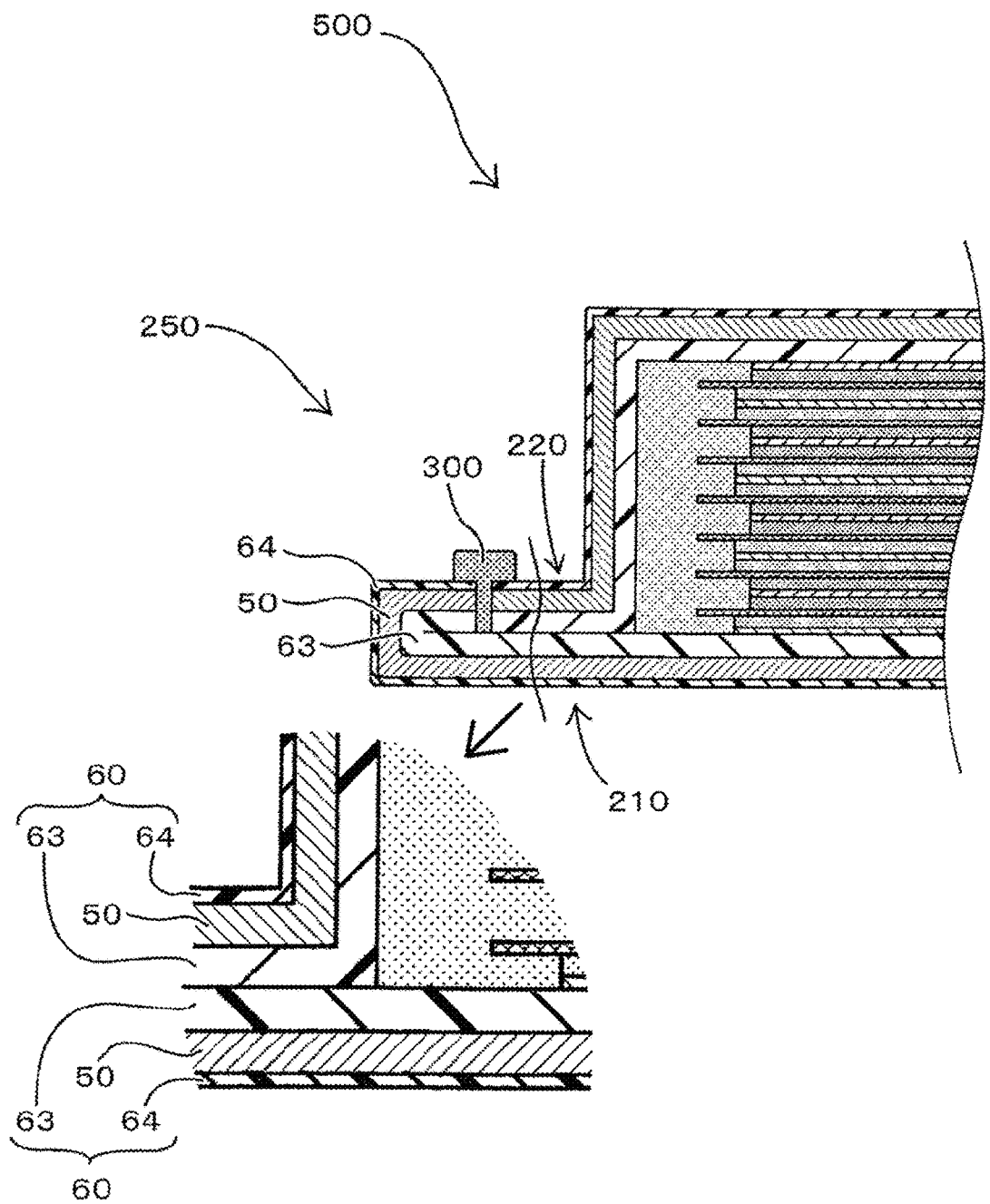
FIG. 5 is a schematic cross-sectional view for describing layer configurations of the first exterior body and the second exterior body.

Regarding the configuration of the sub exterior body itself (that is, the layer configurations of the first exterior body and the second exterior body), as illustrated in FIG. 5, it is preferable that each of the first exterior body 210 and the second exterior body 220 has a laminated structure (for example, laminate structure) including a metal layer 50 and an insulating layer 60. As illustrated in FIG. 5, it is preferable that the insulating layer 60 includes a first insulating layer 63 and a second insulating layer 64, and that the metal layer 50 is interposed between the first insulating layer 63 and the second insulating layer 64. That is, in each of the first exterior body 210 and the second exterior body 220, it is preferable that the metal layer 50 is in a form of being sandwiched between the two insulating layers (63 and 64). Thus, even though the metal layer 50 is included in the exterior body as described above, in the secondary battery of the present invention, the metal layer including the end surface is not exposed to the outside, and even through the metal layer is not exposed, the thickness of the sealing edge is not substantially increased.

As for the insulating layers constituting the sub exterior body, the second insulating layer 64 may be a heat resistant resin layer while the first insulating layer 63 is a heat fusion resin layer. In such a case, it is preferable that the sealing edge 250 have a portion where the first insulating layer 63 of the first exterior body 210 and the first insulating layer 63 of the second exterior body 220 are in direct contact with each other (in particular, such a portion may be located at a position on the inner side with respect to the insulating material 300 in the sealing edge 250). That is, it is preferable that the sealing edge is configured in a form in which the heat fusion resin layers of the first exterior body 210 and the second exterior body 220 are in contact with each other. This is because the heat fusion resin layers may be fused to each other in treatment of obtaining the sealing edge (for example, heat sealing treatment), and may function as a bonding material between the first exterior body 210 and the second exterior body 220.

In a preferred embodiment, the resin layer of the sub exterior body is suitably used for "folding". Specifically, it is preferable that the sub exterior body to be folded be in a form in which the heat fusion resin layer be directly overlapped. That is, in the case where the first insulating layer 63 is a heat fusion resin layer and the second insulating layer 64 is a heat resistant resin layer, it is preferable that one of the first exterior body and the second exterior body is folded back so that the heat fusion resin layer is located relatively on the inner side (see FIG. 5). By a bonding action of the heat fusion resin layer, the folded state is easily maintained, and a more preferable sealing edge is obtained. As can be seen from the embodiment illustrated in FIG. 5, in the sealing edge 250, one of the first exterior body and the second exterior body is folded back so that the metal layer 50 is located relatively on the outer side with respect to the first insulating layer 63 (insulating layer having a portion in direct contact with itself so as to be overlapped due to folding).

The metal layer constituting the sub exterior body is a layer that contributes to permeation prevention of moisture and/or gas, and is preferably a metal foil. Although it is only an example, as the metal of such a metal layer, there can be given at least one selected from the group consisting of aluminum, copper, stainless steel and the like. The heat fusion resin layer constituting the sub exterior body is a layer that protects the metal layer from the electrolyte contained in the exterior body and contributes to melt sealing by heat sealing. The resin of such a heat fusion resin layer may be polyolefin and/or acid-modified polyolefin, and may be, for example, at least one selected from the group consisting of polypropylene and polyethylene. In addition, the heat resistant resin layer constituting the sub exterior body is a layer that contributes to preventing the metal layer from being damaged by permeation and contact of moisture and the like. As resin of this heat resistant resin layer, there can be given at least one selected from the group constituting of nylon, polyamide, polyester, and the like.

Figure 6:
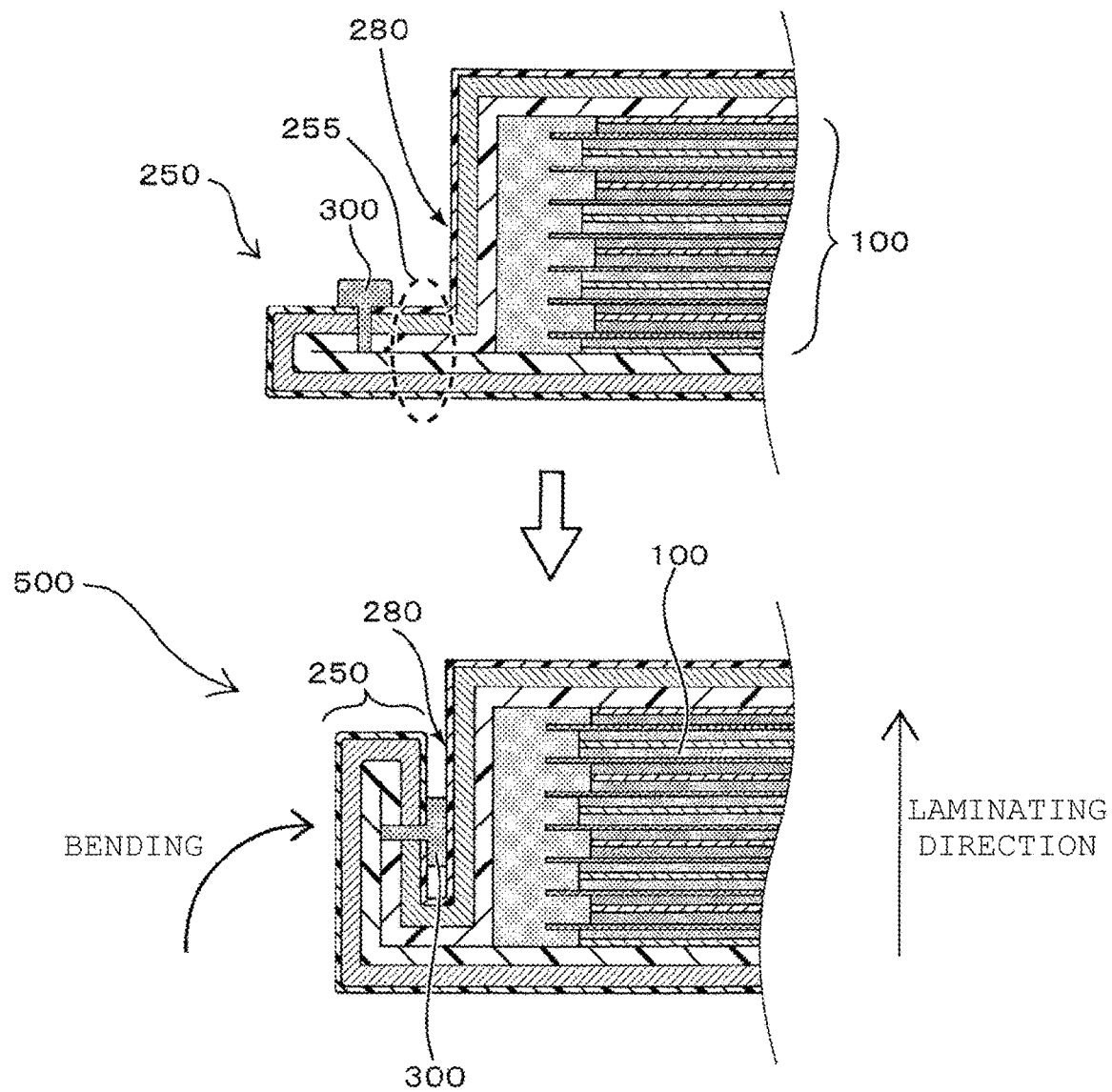
FIG. 6 is a schematic cross-sectional view for describing a sealing edge in a once bending form.

The secondary battery of the present invention can be embodied in various suitable forms. For example, as illustrated in FIG. 6, the sealing edge 250 may have a form of being bent once as a whole. That is, the "sealing edge 250 formed by folding back one of the sub exterior bodies so that the end surfaces of the sub exterior bodies face each other" may have a form of being bent largely only once (for example, as illustrated in FIG. 6, it may be bent to have an angle of about 90°). In particular, it is preferred that the bending point of the sealing edge 250 be more proximal to the electrode assembly. As specifically illustrated in FIG. 6, it is preferable that a local sealing edge portion 255 closer to the side surface portion 280 of the exterior body surrounding the side surface of the electrode assembly 100 is a bending point of the sealing edge 250. In other words, in the bent sealing edge 250, it is preferable that the "root portion" 255 in the "protruding form of protruding outward from the side surface portion 280 of the exterior body" forms a bending point.

In the sealing edge having the bending form, since the protruding dimension of the sealing edge (dimension in which the sealing edge protrudes in the right-and-left direction in the cross section) is reduced, the size of the secondary battery in the plan view is reduced by the reduction of the protruding dimension. Further, although the size of such a secondary battery in the plan view is reduced, the electrode assembly itself is not reduced in size, and the battery capacity is not substantially reduced. Therefore, in the present invention, a secondary battery having a compact battery size can be realized without substantially reducing the battery capacity. In other words, according to the present invention, it can be said that a secondary battery with a higher energy density per unit volume can be realized. In particular, such a secondary battery of the present invention can be suitably used for mobile devices and the like.

In the present specification, the "form of being bent once" broadly means that the sealing edge is not bent a plurality of times (specifically, twice or more). In a narrow sense, the expression refers to a situation that the sealing edge formed by the combination of the first exterior body and second exterior body is preferably bent only once as a whole, and hence the bending point in the entire sealing edge is one. That is, even if an element constituting the sealing edge is folded back, the sealing edge is largely bent once (preferably, it is bent to form an angle of about 90° as illustrated in FIG. 6). In addition, if the point of the energy density per unit volume is not regarded as the most important, the bending of the sealing edge may be not only once but may be once or more.

Preferably, the sealing edge is bent so that the sealing edge faces in the laminating direction of the electrode assembly. That is, as illustrated in the lower part of FIG. 6, it is preferable that the sealing edge 250 includes a bent portion so that the sealing edge 250 as a whole is erected along the laminating direction of the electrode assembly 100. As a result, the protruding dimension of the sealing edge can be further reduced to reduce the size of the secondary battery in the plan view, and the secondary battery of the present invention has a higher energy density per unit volume.

As can be seen from the embodiment illustrated in FIG. 6, in the present invention, "the sealing edge is bent so as to be erected along the laminating direction" means that the portion from the bending point of the sealing edge to the distal end thereof is substantially parallel to the electrode laminating direction of the electrode assembly. The term "substantially parallel" as used herein does not have to be perfect "parallel", and means that it may be an embodiment slightly shifted therefrom (for example, an embodiment in which the angle formed by the extending direction and the electrode laminating direction in "the portion from the bending point of the sealing edge to the distal end thereof" is about 0° to 10°). As can be seen from the embodiment illustrated in FIG. 6, assuming a secondary battery arranged so that the electrode laminating direction of the electrode assembly is along the vertical direction, the sealing edge 250 extends substantially along the vertical direction.

In a preferred embodiment, the bent sealing edge and the insulating material have a unique arrangement relationship. Specifically, as illustrated in FIG. 6, the bent sealing edge 250 is bonded to the side surface portion 280 of the exterior body surrounding the side surface of the electrode assembly 100 (hereinafter also referred to as an "exterior-body side surface portion") with the insulating material 300 therebetween. That is, it is preferable that the bent sealing edge 250 is in a form of being bonded to the exterior-body side surface portion 280 by the insulating material 300. In other words, the bonding between the sealing edge and the side surface portion of the exterior body is performed with the insulating material extending to between the sealing edge and the side surface portion (in particular, the insulating material extending from a region between one end surface and the other side surface of the facing sub exterior bodies to a region between the sealing edge and side surface portion of the exterior body located on the outer side.

In such an embodiment, the inventor of the present application has found that the bent sealing edge does not necessarily plastically deform in the long run. It is generally considered by those skilled in the art that an exterior body itself of a laminate film (especially a sub exterior body) has a "film shape" and therefore exhibits plastic deformation. However, the inventor of the present application has found that the sealing edge is formed by a combination of sub exterior bodies, and may not substantially exhibit the behavior of plastic deformation as it is, and in the long term, a force to return to an original shape acts easily. This is particularly noticeable in the "case where one of the sub exterior bodies is folded back so that the end surfaces of the sub exterior bodies face each other". More specifically, the tendency of the sealing edge which does not substantially exhibit the behavior of plastic deformation is particularly noticeable in the case where one of the sub exterior bodies is folded back so that the end surfaces of the sub exterior bodies face each other and in the case where the metal layer is located on the outer side with respect to the first insulating layer (preferably, the heat fusion resin layer) in the one folded sub exterior body. In this regard, in the present invention, since the bent sealing edge is bonded to the exterior-body side surface portion with the insulating material interposed therebetween, bending back is more preferably prevented. The secondary battery of the present invention based on such a preferred embodiment not only has a higher energy density per unit volume but is also excellent in long-term stability because such "bending back" is effectively prevented.

In the secondary battery of the present invention, it is preferable that the insulating material has adhesiveness. This results in a condition in which the bent sealing edge is more firmly bonded to the exterior-body side surface portion. In particular, since the insulating material having adhesiveness is filled between the end surfaces of the sub exterior bodies facing each other, an anchor effect can be exhibited and a bent sealing edge with improved bonding reliability can be obtained.

An insulating material having adhesiveness may have an adhesive component. The "adhesive component" referred to here is not particularly limited as long as it contributes to the bonding and adhesion of the bent sealing edge to the exterior-body side surface portion. Preferably, components of the adhesive exhibiting insulating properties are preferred. As such an adhesive, there can be given, for example, acrylic adhesives such as acrylic ester copolymer, rubber adhesives such as natural rubber, silicone adhesives such as silicone rubber, urethane adhesives such as urethane resin, α-olefin adhesive, an ether adhesive, an ethylene-vinyl acetate resin adhesive, an epoxy resin adhesive, a vinyl chloride resin adhesive, a chloroprene rubber adhesive, a cyanoacrylate adhesive, an aqueous polymer-isocyanate adhesive, a styrene-butadiene rubber adhesive, a nitrile rubber adhesive, a nitrocellulose adhesive, a reactive hot melt adhesive, a phenolic resin adhesive, a modified silicone adhesive, a polyamide resin adhesive, a polyimide adhesive, a polyurethane resin adhesive, a polyolefin resin adhesive, a polyvinyl acetate resin adhesive, a polystyrene resin solvent adhesive, a polyvinyl alcohol adhesive, a polyvinyl pyrrolidone resin adhesive, a polyvinyl butyral resin adhesive, a polybenzimidazole adhesive, a polymethacrylate resin adhesive, a melamine resin adhesive, a urea resin adhesive, a resorcinol adhesive, and the like.

Although the embodiments of the present invention have been described above, the typical examples are merely illustrated. Accordingly, those skilled in the art readily understand that the present invention is not limited thereto, and various embodiments are conceivable.

Finally, the disclosure of "Japanese Patent Application Laid-Open No. 2004-55154" is additionally described. Japanese Patent Application Laid-Open No. 2004-55154 discloses a technology for bonding peripheral edges of laminate films. The technology disclosed in this publication is based on laser welding, and the features and concepts for sealing are essentially different from the present invention. Further, the inventor of the present application has found that the following problems exist in the technology disclosed in the publication described above.

At butt portions 12*b* and 13*d* of aluminum foil layers a, nylon layers y of exterior films are volatilized by laser welding. Thus, the aluminum foil layers are exposed, and an insulating property of an exterior body is impaired.

Since metal portions are bonded by laser, not only nylon layers but also resin layers are actually thermally affected. Therefore, the reliability is impaired in the actual battery.

In the first place, using a laser for bonding is expensive and unrealistic.

In other words, at the sealing edge of the exterior body in the present invention (in particular, the sealing edge formed by folding one of the two sub exterior bodies), a portion that is a laser welding portion does not exist.

The secondary battery according to the present invention can be used in various fields where storage of electricity is assumed. Although it is only an example, the secondary battery can be used in the fields of electricity, information, and communication in which mobile devices and the like are used (for example, the fields of mobile devices such as mobile phones, smart watches, smartphones, laptop computers, digital cameras, activity meters, arm computers, and electronic paper), home and small industrial applications (for example, the fields of electric tools, golf carts, and home, care, and industrial robots), large industrial applications (for example, the fields of forklifts, elevators, and harbor cranes), the fields of transportation systems (for example, the fields of hybrid vehicles, electric cars, buses, trains, electrically assisted bicycles, and electric motorcycles), power system applications (for example, in the fields of various power generations, road conditioners, smart grids, general household installed electricity storage systems), the IoT fields, and space and deep sea applications (for example, in the fields of space probes and diving research vessels).

DESCRIPTION OF REFERENCE SYMBOLS

1: positive electrode
2: negative electrode
3: separator
10: electrode configuration layer
50: metal layer
60: insulating layer
63: first insulating layer
64: second insulating layer
100: electrode assembly
110: side surface of electrode assembly
200: exterior body
210: first exterior body (sub exterior body)
215: end surface of first exterior body
220: second exterior body (sub exterior body)
225: end surface of second exterior body
250: sealing edge
280: exterior-body side surface portion
300: insulating material
500: secondary battery

The invention claimed is:

1. A secondary battery comprising: an electrode assembly; a first exterior body and a second exterior body which together house the electrode assembly, the first exterior body and the second exterior body defining a sealing edge, wherein, at the sealing edge, one of the first exterior body and the second exterior body is folded back upon itself so that a first end surface of the first exterior body and a second end surface of the second exterior body face each other, in a same plane and define a gap therebetween; and an insulating material within the gap defined between the first end surface and the second end surface.

2. The secondary battery according to claim 1, Wherein a thickness of the sealing edge is not greater than a total thickness of the first exterior body and the second exterior body.

3. The secondary battery according to claim 1, wherein the insulating material extends onto at least one main surface of the first exterior body or the second exterior body.

4. The secondary battery according to claim 1, wherein the insulating material extends onto main surfaces of both the first exterior body and the second exterior body.

5. The secondary battery according to claim 4, wherein the insulating material has a T shape.

6. The secondary battery according to claim 1, wherein the insulating material has a T shape.

7. The secondary battery according to claim 1, wherein each of the first exterior body and the second exterior body has a laminated structure including a first insulating layer, a second insulating layer, and a metal layer interposed between the first insulating layer and the second insulating layer.

8. The secondary battery according to claim 7, wherein the first insulating layer is a heat fusion resin layer, the second insulating layer is a heat resistant resin layer, and the one of the first exterior body and the second exterior body is folded back so that the heat fusion resin layer is located relatively on an inner side thereof.

9. The secondary battery according to claim 7, wherein the one of the first exterior body and the second exterior body is folded hack so that the metal layer is located relatively on an outer side thereof with respect to the first insulating layer.

10. The secondary battery according to claim 1, wherein the first exterior body and the second exterior body are constructed of flexible materials.

11. The secondary battery according to claim 1, wherein the sealing edge is in a form of being bent once as a whole.

12. The secondary battery according to claim 11, wherein the sealing edge is bent so that the sealing edge is aligned along a laminating direction of the electrode assembly.

13. The secondary battery according to claim 11, wherein the bent sealing edge is bonded to a side surface portion of the exterior body that surrounds a side surface of the electrode assembly such that the insulating material interposed between the sealing edge and the side surface portion of the exterior body.

14. The secondary battery according to claim 13, wherein the insulating material is bonded to the side surface portion of the exterior body.

15. The secondary battery according to claim 1, wherein the insulating material comprises a material having adhesiveness.

16. The secondary battery according to claim 1, wherein the electrode assembly includes a positive electrode and a negative electrode capable of storing and releasing lithium ions.

17. The secondary battery according to claim 1, wherein the secondary battery is constructed as a secondary battery for a mobile device.

* * * * *